United States Patent
Pechtold et al.

(10) Patent No.: US 8,875,735 B2
(45) Date of Patent: Nov. 4, 2014

(54) COOLANT VENTILATION SYSTEM

(75) Inventors: Rainer Pechtold, Russelsheim (DE); Ralph T. J. Hobmeyr, Mainz-Kastel (DE)

(73) Assignee: GM Global Technology Operations LLC, Detroit, MI (US)

( * ) Notice: Subject to any disclaimer, the term of this patent is extended or adjusted under 35 U.S.C. 154(b) by 2779 days.

(21) Appl. No.: 11/341,546

(22) Filed: Jan. 27, 2006

(65) Prior Publication Data

US 2007/0175894 A1    Aug. 2, 2007

(51) Int. Cl.
| | |
|---|---|
| *B60K 15/05* | (2006.01) |
| *B60K 15/035* | (2006.01) |
| *F17C 13/12* | (2006.01) |
| *F17C 13/04* | (2006.01) |
| *F16K 11/04* | (2006.01) |
| *H01M 8/04* | (2006.01) |

(52) U.S. Cl.
CPC ............ *H01M 8/04007* (2013.01); *Y02E 60/50* (2013.01); *Y02T 90/32* (2013.01); *H01M 2250/20* (2013.01)
USPC ....................... 137/588; 137/625.12; 137/628

(58) Field of Classification Search
USPC ............ 137/588, 512, 625.12, 628; 220/88.2; 222/479; 141/325
See application file for complete search history.

(56) References Cited

U.S. PATENT DOCUMENTS

| | | | | |
|---|---|---|---|---|
| 3,073,333 | A | * | 1/1963 | Cherrington ................... 137/202 |
| 4,437,492 | A | * | 3/1984 | Taylor ....................... 137/543.13 |
| 4,483,461 | A | * | 11/1984 | Igarashi ............................. 222/3 |
| 4,502,516 | A | * | 3/1985 | Shields .......................... 141/290 |
| 4,584,164 | A | * | 4/1986 | McMullin et al. ............. 376/216 |
| 5,050,690 | A | * | 9/1991 | Smith ............................. 175/50 |
| 2004/0080186 | A1 | * | 4/2004 | Crepeau et al. .......... 296/203.01 |
| 2005/0161521 | A1 | * | 7/2005 | Guyer .......................... 237/12.1 |

FOREIGN PATENT DOCUMENTS

DE    2 122 422 A1    1/1972

\* cited by examiner

*Primary Examiner* — Atif Chaudry
(74) *Attorney, Agent, or Firm* — John A. Miller; Miller IP Group, PLC

(57) ABSTRACT

A coolant reservoir and associated multi-functional unit for a thermal sub-system of a fuel cell system. The coolant reservoir includes a flame arrester positioned in a gas region of the reservoir. The multi-functional unit includes a first pressure relief valve that automatically opens if the pressure within the gas region goes above a first predetermined pressure. The multi-functional unit may also include a second pressure release valve that quickly releases pressure in the coolant reservoir if the pressure within the gas region goes above a second higher predetermined pressure. The multi-functional unit also includes an air-line and a check valve for allowing ambient air to enter the gas region if the pressure within the gas region falls below ambient pressure. The multi-functional unit also includes a cooling fluid fill line having plumbing that causes the coolant reservoir to vent prior to a cooling fluid cap being removed.

19 Claims, 2 Drawing Sheets

COOLANT VENTILATION SYSTEM

BACKGROUND OF THE INVENTION

1. Field of the Invention

This invention relates generally to a cooling fluid ventilation system for a fuel cell stack and, more particularly, to a cooling fluid ventilation system for a fuel cell stack, where the ventilation system includes a flame arrester within a coolant reservoir, and a compact multi-functional unit for venting and filling the coolant reservoir.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. A PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and membrane define a membrane electrode assembly (MEA). MEAs are relatively expensive to manufacture and require certain conditions for effective operation.

Many fuel cells are typically combined in a fuel cell stack to generate the desired power. The fuel cell stack receives a cathode input gas, typically a flow of air forced through the stack by a compressor. Not all of the oxygen in the air is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack. The bipolar plates include an anode side and a cathode side for adjacent fuel cells in the stack. Anode reactant gas flow channels are provided on the anode side of the bipolar plates that allow the anode gas to flow to the MEA. Cathode reactant gas flow channels are provided on the cathode side of the bipolar plates that allow the cathode gas to flow to the MEA. The bipolar plates are made of a conductive material, such as stainless steel, so that they conduct the electricity generated by the fuel cells out of the stack. The bipolar plates also include flow channels through which a cooling fluid flows.

It is necessary that a fuel cell operate at an optimum relative humidity and temperature to provide efficient stack operation and durability. The temperature provides the relative humidity within the fuel cells in the stack for a particular stack pressure. Excessive stack temperature above the optimum temperature may damage fuel cell components, reducing the lifetime of the fuel cells. Also, stack temperatures below the optimum temperature reduce the stack performance.

Fuel cell systems employ thermal sub-systems that control the temperature within the fuel cell stack. Particularly, a cooling fluid is pumped through the cooling channels in the bipolar plates in the stack. Typically the cooling fluid is a liquid that inhibits corrosion within the stack, does not freeze in cold environments, and is non-conductive. One example of a suitable cooling fluid is a de-ionized water and glycol mixture. It is necessary that the cooling fluid be non-conductive so that current does not travel across the cooling fluid channels in the stack.

The thermal sub-system includes a coolant reservoir that equalizes the thermal expansion of the cooling fluid in the thermal sub-system, and replenishes the small losses of the cooling fluid that occur during stack operation. If the pressure of the gas within the reservoir exceeds a certain pressure, an over-pressure valve will open and release some of the gas to the atmosphere until the pressure is equalized. The coolant reservoir is typically positioned at the highest location in the thermal sub-system.

Hydrogen is a very thin gas and is difficult to contain within an enclosed environment. Because of this hydrogen typically permeates through stack and plate materials and seals within the fuel cell stack, especially around the plates of the stack. Hydrogen leaks into the cooling fluid channels where it is dissolved in the cooling fluid or is trapped in the cooling fluid as hydrogen bubbles.

The impeller of the pump creates cavitation that produces air bubbles that are trapped in the coolant loop. The system includes a ventilation line that allows the air bubbles to be removed from the coolant loop and enter the reservoir. In addition to the air bubbles, the hydrogen bubbles that are trapped within the cooling fluid are also vented to the reservoir, where they accumulate in an air pocket within the reservoir.

This accumulation of hydrogen and air within the reservoir is a combustible source that could ignite. Generally the reservoir includes movable parts, such as the over-pressure valve, that could cause a spark and ignite the combustible mixture of hydrogen and air. Also, the accumulation of hydrogen and air within the reservoir creates a pressure build up therein. The reservoir typically includes a cap that covers a fill port through which the reservoir is filled when necessary. If the cap is removed before the pressure in the reservoir is reduced, the cap may fly upwards under pressure. Thus, it is desirable to remove the pressure within the reservoir before the cap is removed.

Even if the pressure is released in the reservoir before the cap is removed, some ignitable gas may reach the environment. However, if the pressure is reduced, the amount of gas will be so small that it mixes with the ambient air fast enough so that it is not combustible. In other words, if the cap is removed shortly after the fuel cell is operated before the pressure in the reservoir is reduced, and ignitable gas is present in the reservoir, the gas may be released into the environment where it could ignite. If the cap is removed shortly after the fuel cell is operated, but after the pressure in the reservoir is reduced, any ignitable gas present in the reservoir escapes from the reservoir and will mix with the ambient air fast enough so that the danger of ignition does not exist.

To prevent the accumulation of a combustible gas within the air pocket in the reservoir, it is known to periodically remove the hydrogen and gas mixture. Particularly, it is known to pump air into the air pocket in the reservoir, where the existing air/hydrogen mixture within the air pocket is vented from the reservoir through an outlet pipe. This operation removes the hydrogen from the reservoir, while maintaining the air pocket. However, by continually pumping air into the reservoir, the cooling fluid flow from the reservoir may become contaminated with dirt and the like, and therefore, a filter is required. Also, the air from the pump causes some of the cooling fluid to evaporate, which requires that the reservoir be filled more often. Further, the pump may have to be heated so that it does not freeze in sub-zero environments. Also, the ventilation system requires complex electrical systems to guarantee the operation of the ventilation system for safety purposes.

Another possible solution is to include a catalyst in the air pocket that converts the hydrogen and oxygen into water. However, catalysts will operate in this environment only if they are heated to a relatively high degree, where water droplets hitting the catalyst at the surface will immediately evaporate. Also, a device could be added that provides additional air to the reservoir in the event there is a shortage of oxygen in the air pocket to convert all of the hydrogen.

SUMMARY OF THE INVENTION

In accordance with the teachings of the present invention, a coolant reservoir and associated multi-functional unit for a thermal sub-system of a fuel cell system is disclosed. The coolant reservoir includes a flame arrester positioned in a gas region of the reservoir where most of the gas is between the flame arrester and the cooling fluid within the coolant reservoir. The multi-functional unit includes a first pressure relief valve and a flow restrictor, where the pressure relief valve automatically opens if the pressure within the gas region exceeds a first predetermined pressure. The multi-functional unit may also include a second pressure release valve that quickly releases pressure in the coolant reservoir if the pressure within the gas region goes above a second higher predetermined pressure. The multi-functional unit also includes an air input line and a check valve for allowing ambient air to enter the coolant reservoir if the pressure within the gas region falls below the ambient pressure. The multi-functional unit also includes a coolant fill line having suitable plumbing that causes the coolant reservoir to vent prior to the cooling fluid cap being removed. In one embodiment, the coolant fill cap includes a pair of seals that allow the coolant reservoir to be vented as the cooling fill cap is being unthreaded.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a multi-functional unit for a coolant reservoir in a fuel cell system is merely exemplary in nature, and is in no way intended to limit the invention or its applications or uses.

Figure 1:
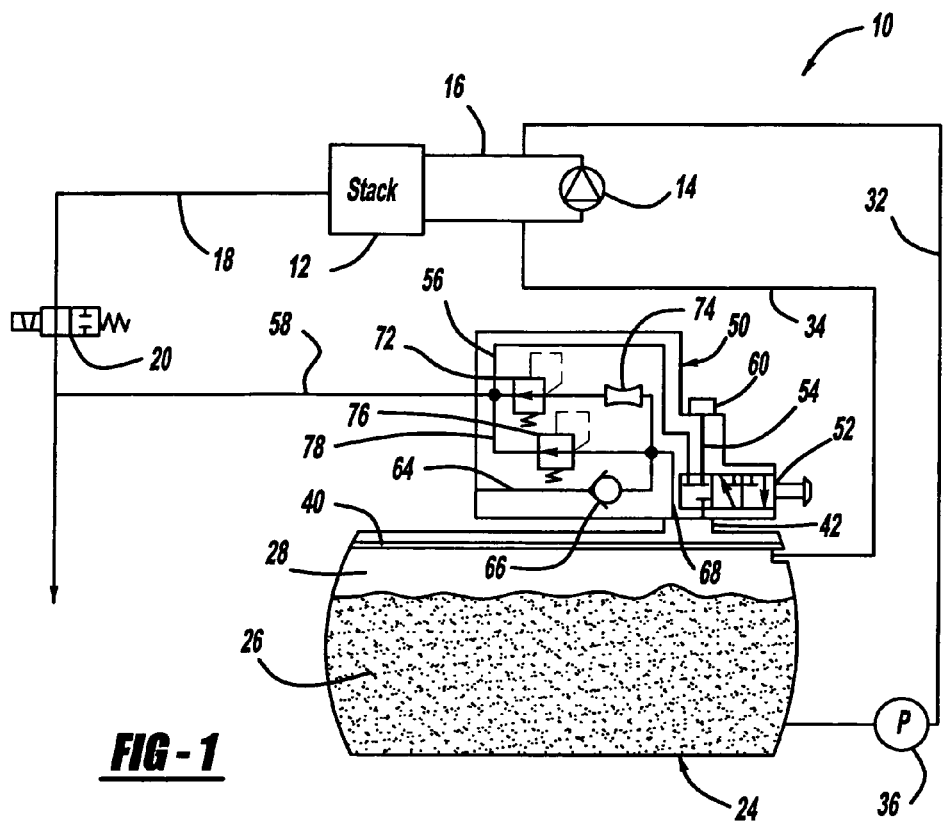
FIG. 1 is a schematic diagram of a fuel cell system including a coolant reservoir having a flame arrester therein and a multi-functional unit, according to an embodiment of the present invention.

FIG. 1 is a schematic diagram of a fuel cell system 10 including a fuel cell stack 12. A pump 14 pumps a cooling fluid through the stack 12 and an external coolant loop 16. A cathode exhaust from the stack 12 is output on line 18 through a back-pressure valve 20 to be exhausted to the environment, or recycled. The cooling fluid may provide heat to the stack 12 during start-up or remove heat from the stack 12 during fuel cell operation to maintain the stack at a desirable operating temperature, such as 80° C. The system 10 includes a coolant reservoir 24 that holds the cooling fluid 26 and provides the cooling fluid to the coolant loop 16 on line 32. The coolant reservoir is typically positioned at the highest location in the thermal sub-system. A gas region 28 provides a compressible region within the reservoir 24. The bubbles from the cooling fluid in the coolant loop 16 are vented on line 34 to the gas region 28. A pressure sensor 36 measures the pressure in the line 32, but can be positioned at any suitable location in the system 10 to provide the cooling fluid pressure.

According to the invention, a flame arrester 40 is positioned within the gas region 28 so that there is a minimal amount of gas above the flame arrester 40. Because there are no moving parts between the flame arrester 40 and the cooling fluid 26, there is no possibility of a spark occurring, which could ignite the combustible mixture of hydrogen and oxygen that may exist therein. Also, because the volume of the gas above the flame arrester 40 is so small, any combustion in this area of the gas region 28 will not cause any damage. Further, if there did happen to be combustion in the gas region 28, the flame arrester 40 would prevent the flame from crossing the flame arrester 40 to the other side of the gas region 28. Flame arresters that provide this function are known in the art, and are typically a metal mesh structure including holes therethrough. In one embodiment, the holes are about 0.4 μm to provide the flame retardation.

The coolant reservoir 24 and the coolant loop 16 are filled through a fill port 42. Therefore, the flame arrester 40 may prevent the coolant reservoir 24 and the coolant loop 16 from being filled fast enough. Therefore, a separate fill tube (not shown) may be provided to accommodate the initial filling of the coolant reservoir 24. Any subsequent addition of the cooling fluid to the coolant reservoir 24 can be provided through the fill port 42 because it will be a minimal amount, as will be discussed in more detail below.

A multi-functional unit 50 is mounted to the coolant reservoir 24 over the fill port 42. The unit 50 includes a manual 3/3 way valve 52 that connects a fill line 54 to the fill port 42 and the fill port 42 to a vent line 56. In the left position of the valve 52 that is shown, both the fill line 54 and the vent line 56 are disconnected from the fill port 42. If an operator wishes to fill the coolant reservoir 24 with more cooling fluid through the fill line 54, he will slide the manual valve 52 from the left position to the right position through the middle position. When the valve 52 reaches the middle position, the fill port 42 is connected to the vent line 56 so that gas within the gas region 28 is vented out of the coolant reservoir 24 on line 58 to the cathode exhaust. Therefore, the pressure in the gas region 28 will be reduced so that the reservoir 24 can be opened. As the valve 52 continues to move to the right position, the vent line 56 is disconnected from the fill port 42 and the fill line 54 is connected to the fill port 42. The operator can then safely remove a fill cap 60 to fill the coolant reservoir 24 through the fill line 54.

After the fuel cell system 10 is shut down and the temperature of the system 10 decreases, the temperature within the reservoir 24 will also decrease, and thus, the pressure within the reservoir 24 will decrease. The unit 50 includes an air-line 64 and a check valve 66 that allows ambient air at a higher pressure to enter the fill port 42 through line 68, but not allow the gas region 28 to be vented through the line 68. In an alternate embodiment, the line 64 can be coupled to the cathode exhaust line.

During normal operation of the system 10, the pressure within the gas region 28 may increase above a predetermined level, such as 0.6 bar, as a result of the bubbles in the coolant being vented to the reservoir 24. If the pressure within the gas region 28 does increase beyond this predetermined level, it is desirable to reduce the pressure within the gas region 28 for safety purposes. To accomplish this, a vent valve 72 is provided between the vent line 58 and the line 68. The vent valve 72 is calibrated so that it automatically opens if the pressure in the gas region 28 exceeds the predetermined pressure and gas in the gas region 28 is exhausted to the environment or to the cathode exhaust line. A flow restrictor 74 is also positioned between the line 58 and the line 68 to limit the gas flow. The vent valve 72 will close automatically when the pressure difference is lower than the opening pressure of the valve 72 plus a certain valve hysteresis.

It is possible that a malfunction could occur that may cause too much hydrogen to leak into the fuel cell stack 12 and collect in the gas region 28, significantly increasing the pressure therein. The vent valve 72 will open in this situation, however, the flow restrictor 74 may prevent it from venting quickly enough to reduce the pressure before the reservoir 24 cracks or otherwise fails. Therefore, a second vent valve 76 is positioned in line 78 between the line 58 and the line 68 that automatically opens if the pressure within the reservoir exceeds a second predetermined pressure, such as 1.2 bar.

In the case of a malfunction in the fuel cell stack 12 where hydrogen leaks into the cooling fluid, the pressure may be between the opening pressure of the vent valve 72 and the opening pressure of the vent valve 76. Because the pressure sensor 36 is monitoring the pressure in the reservoir 24, it can send a signal to the electronic control unit (not shown) in the system 10 to indicate a potential problem. Although the pressure sensor 36 is shown in the line 32, it can be positioned in the gas region 28. Also, because the pressure sensor 36 is an existing component in the system 10, using it for this purpose eliminates the need for a hydrogen sensor, which are expensive. If there is no need to detect for a malfunction, the vent valve 76 can be eliminated.

Figure 2:
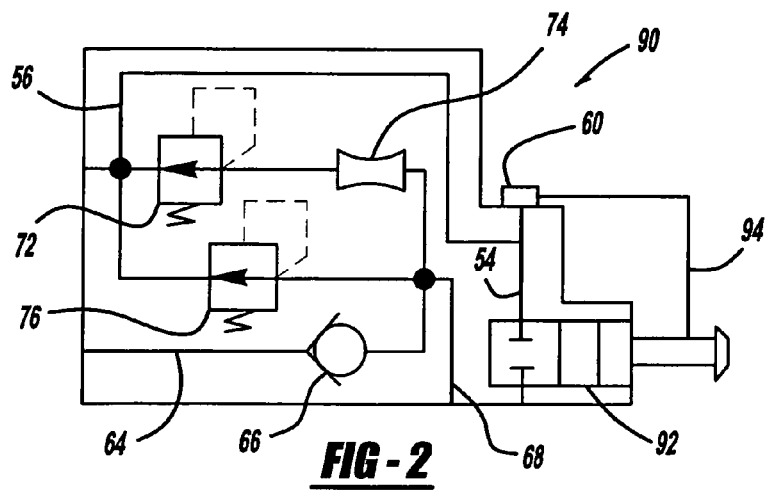
FIG. 2 is a schematic diagram of a multi-functional unit including a manual 2/2 way valve, according to another embodiment of the present invention.

FIG. 2 is a diagram of a multi-functional unit 90 that can replace the multi-function unit 30 in the system 10, where like elements are identified by the same reference numeral. In this embodiment, the 3/3 way valve 52 is replaced with a manual 2/2 way valve 92. Further, the line 56 is directly connected to the fill line 54. In the left position of the valve 92, the fuel line 54 is blocked. When the valve 92 is switched from the left position to the right position to connect the fill line 54 to the fill port 42, the gas region 28 is able to vent to the line 56. A blocking mechanism 94 prevents the cap 60 from being opened until after the valve 92 has been switched to the right position.

Figure 3:
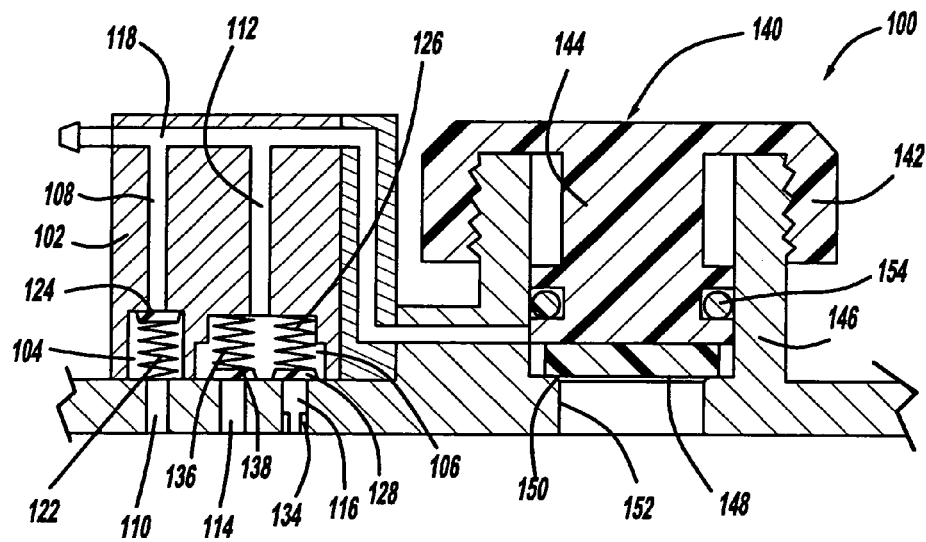
FIG. 3 is a cross-sectional view of a multi-functional unit for a coolant reservoir in a thermal sub-system of a fuel cell system that includes integral pressure relief valves and associated lines, according to another embodiment of the present invention.

The multi-functional unit 50 shows a functional operation of the various components therein for the purposes described above. In a practical design, those components can be integrated in a simple, small and cheap assembly. FIG. 3 is a cross-sectional view of a multi-functional unit 100 that can replace the multi-functional unit 50. The unit 100 includes a valve body 102 defining a first chamber 104 and a second chamber 106. The first chamber 104 is in fluid communication with a passageway 108 and a passageway 110. The chamber 106 is in fluid communication with a passageway 112, a passageway 114 and a passageway 116. The passageways 108 and 112 are in fluid communication with a passageway 118 in the body 102. The passageways 110, 114 and 116 are in fluid communication with the fill port 42. A spring 122 and associated sealing plate 124 are positioned within the chamber 104 and represent the check valve 66. Likewise, a spring 126 and associated sealing plate 128 are positioned within the chamber 106 and represent the vent valve 72. A flow restrictor 134 is positioned within the passageway 116 and represents the flow restrictor 74. A spring 136 and associated sealing plate 138 are positioned within the chamber 106 and represent the vent valve 76. In an alternate embodiment, the passageways 110, 114 and 116 can be in fluid communication with the gas region 28 through one or more separate ports.

If the pressure within the coolant reservoir 24 is less than ambient pressure, the ambient pressure pushes against the sealing plate 124, and compresses the spring 122, which allows air to enter the reservoir 24 and increase the pressure within the gas region 28. The spring 126 is calibrated so that if the pressure within the gas region 28 goes above the first pressure, the pressure within the gas region 28 pushes the sealing plate 128 away from the passageway 116 to allow gas within the gas region 28 to vent to the passageway 118 through the flow restrictor 134 to reduce the pressure in the region 28. The spring 136 is calibrated so that if the pressure within the gas region 28 exceeds the second pressure level, then the pressure within the gas region 28 will push the sealing plate 138 away from the passageway 114 to allow the gas region 28 to quickly vent to the passageway 118 to reduce the pressure therein.

The unit 100 also includes a fill cap 140 including a cap top 142 and a cap body 144. The cap top 142 is threaded onto an extended annular portion 146 so that a flat seal 148 seals against a shoulder 150 to seal a chamber 152 in fluid communication with the fill port 42. Additionally, an O-ring 154 is positioned within an annular channel in the cap body 144 to provide additional sealing.

Figure 4:
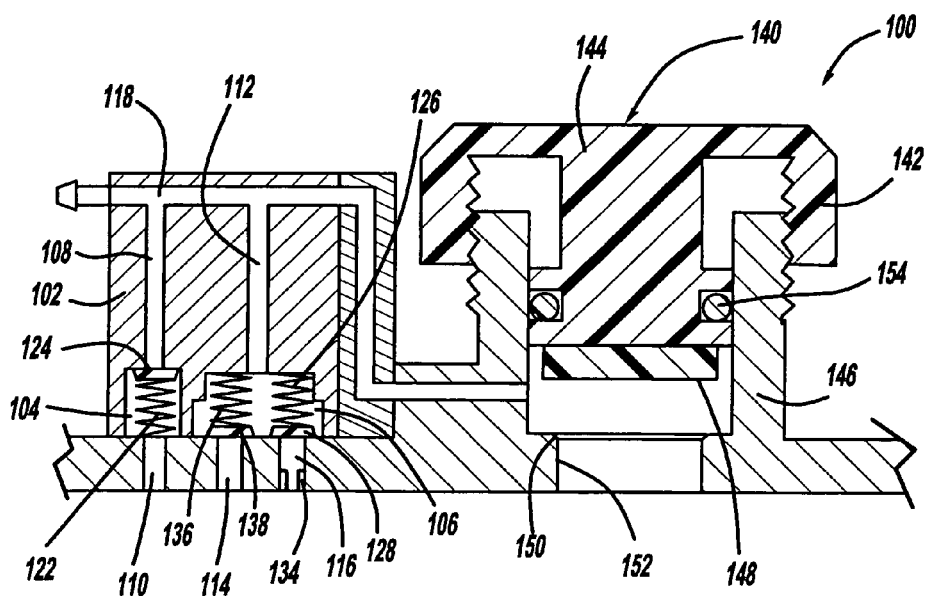
FIG. 4 is a cross-sectional view of the multi-functional unit shown in FIG. 3, where the cap has been threaded partly off so that the gas inside the coolant reservoir can be vented to the environment.

When the fill cap 140 is unthreaded from the annular portion 146, the flat seal 152 will unseal from the shoulder 150, as shown in FIG. 4. Once the cap 140 reaches a certain level, the chamber 152 is in fluid communication with the passageway 118. Further, the O-ring 154 continues to maintain a seal between ambient and the chamber 152. Therefore, the gas region 28 is allowed to vent to the exhaust through the vent line 118 before the cap 140 is completely removed from the unit 100.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A coolant reservoir assembly comprising:
a coolant reservoir for storing a cooling fluid and including a gas region therein, said coolant reservoir including a fill port in fluid communication with the inside of the coolant reservoir; and
a multi-functional unit mounted to the coolant reservoir and covering the fill port, said unit including a vent line and a fill line, said unit further including a first vent valve in fluid communication with the fill port and the vent line, said first vent valve automatically venting the gas region if the pressure of the gas region exceeds a first predetermined pressure, said unit further including a second vent valve in fluid communication with the vent line and the fill port, said second vent valve automatically venting the gas region if the pressure in the gas region exceeds a second predetermined pressure, said unit further including a check valve in fluid communication with the vent line and the fill port, said check valve allowing air to enter the coolant reservoir if the pressure within the gas region is below ambient pressure, said unit further including a fill valve, said fill valve selectively connecting the fill line to the fill port after the gas region is vented, said unit further including an integrated body containing the vent line, the fill line, the first vent valve, the second vent valve, the check valve, the fill valve, and a plurality of fluid passageways.

2. The assembly according to claim 1 wherein the coolant reservoir includes a flame arrester positioned within the gas region.

3. The assembly according to claim 2 wherein the flame arrester is positioned around the fill port.

4. The assembly according to claim 1 wherein the fill valve is a three way valve that includes a closed position, a vent position and a fill position, wherein the vent position must be connected to the fill line before the fill position is connected to the fill line.

5. The assembly according to claim 1 wherein the fill valve is a two way valve that includes a closed position and a fill position and wherein the unit further includes a blocking mechanism and a fill cap, wherein the blocking mechanism prevents the fill cap from being opened until the fill valve is moved to the fill position.

6. The assembly according to claim 1 wherein the first vent valve, the second vent valve and the check valve each include a spring and associated sealing plate mounted within a chamber, said chamber being contained in the integrated body.

7. The assembly according to claim 1 wherein the fill valve includes a flat seal positioned between the fill port and the vent line that prevents the coolant reservoir from venting to the vent line when a fill cap is completely closed, and allows the coolant reservoir to vent to the vent line when the fill cap is partially removed.

8. The assembly according to claim 7 wherein the fill valve includes an O-ring that seals the fill cap when it is partially removed.

9. The assembly according to claim 1 wherein the first vent valve includes a flow restrictor.

10. The assembly according to claim 1 wherein the assembly is part of a thermal sub-system associated with a fuel cell system on a vehicle.

11. A multi-functional unit for a coolant reservoir, said coolant reservoir storing a cooling fluid and including a gas region therein, said coolant reservoir including a fill port in fluid communication with the inside of the coolant reservoir, said multi-functional unit mounted to the coolant reservoir and covering the fill port, said multi-functional unit comprising:

a vent line;

a fill line;

a first vent valve in fluid communication with the fill port and the vent line, said first vent valve automatically venting the gas region if the pressure in the gas region exceeds a first predetermined pressure;

a check valve in fluid communication with the vent line and the fill port, said check valve allowing air to enter the gas region if the pressure within the gas region is below ambient pressure;

a fill valve, said fill valve selectively connecting the fill line to the fill port after the gas region is vented; and an integrated body containing the vent line, the fill line, the first vent valve, the check valve, the fill valve, and a plurality of fluid passageways.

12. The unit according to claim 11 further comprising a second vent valve in fluid communication with the vent line and the fill port, said second vent valve being contained in the integrated body, said second vent valve automatically venting the gas region if the pressure in the gas region exceeds a second predetermined pressure, said second predetermined pressure being greater than the first predetermined pressure.

13. The unit according to claim 11 wherein the fill valve is a three way valve that includes a closed position, a vent position and a fill position, wherein the vent position must be connected to the fill port before the fill position is connected to the fill port.

14. The unit according to claim 11 wherein the fill valve is a two way valve that includes a closed position and a fill position and wherein the unit further includes a blocking mechanism and a fill cap, wherein the blocking mechanism prevents the fill cap from being opened until the fill valve is moved to the fill position.

15. The unit according to claim 11 wherein the first vent valve and the check valve each include a spring and associated sealing plate mounted within a chamber, said chamber being contained in the integrated body.

16. The unit according to claim 11 wherein the fill valve includes a flat seal positioned between the fill port and the vent line that prevents the gas region from venting to the vent line when the fill cap is completely closed, and allows the gas region to vent to the vent line when the fill cap is partially removed.

17. The unit according to claim 16 wherein the fill valve includes an O-ring that seals the fill cap when it is partially removed.

18. The unit according to claim 11 wherein the first vent valve includes a flow restrictor.

19. The unit according to claim 11 wherein the unit and the coolant reservoir are part of a thermal sub-system associated with a fuel cell system on a vehicle.

* * * * *